(12) United States Patent
Hartwich et al.

(10) Patent No.: US 11,936,498 B2
(45) Date of Patent: Mar. 19, 2024

(54) DEVICE FOR A SUBSCRIBER STATION OF A SERIAL BUS SYSTEM AND METHOD FOR COMMUNICATION IN A SERIAL BUS SYSTEM

(71) Applicant: Robert Bosch GmbH, Stuttgart (DE)

(72) Inventors: Florian Hartwich, Reutlingen (DE); Arthur Mutter, Neuhausen (DE); Steffen Walker, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 299 days.

(21) Appl. No.: 17/615,674

(22) PCT Filed: May 27, 2020

(86) PCT No.: PCT/EP2020/064670
§ 371 (c)(1),
(2) Date: Jan. 10, 2022

(87) PCT Pub. No.: WO2020/244985
PCT Pub. Date: Dec. 10, 2020

(65) Prior Publication Data
US 2022/0239527 A1 Jul. 28, 2022

(30) Foreign Application Priority Data
Jun. 3, 2019 (DE) .................... 10 2019 208 059.6

(51) Int. Cl.
*H04L 12/413* (2006.01)
*H04L 12/40* (2006.01)

(52) U.S. Cl.
CPC ........ *H04L 12/413* (2013.01); *H04L 12/4013* (2013.01); *H04L 2012/40215* (2013.01)

(58) Field of Classification Search
None
See application file for complete search history.

(56) References Cited

U.S. PATENT DOCUMENTS 4,309,673 A * 1/1982 Norberg .................... H03L 7/00
332/112
4,658,648 A * 4/1987 Roddeck ................ G01B 17/02
702/171

(Continued)

FOREIGN PATENT DOCUMENTS

CN 106063198 A 10/2016
CN 106068631 A 11/2016

(Continued)

OTHER PUBLICATIONS

International Search Report for PCT/EP2020/064670 dated Aug. 5, 2020.
ISO 11898-1:2015 STANDARD, 2015, pp. 1-74.

*Primary Examiner* — Christopher T Wyllie
(74) *Attorney, Agent, or Firm* — NORTON ROSE FULBRIGHT US LLP; Gerard A. Messina

(57) ABSTRACT

A device and method for a serial bus system. The device has a transmit signal analysis module for counting edges of a transmit signal to be transmitted on a bus of the bus system; a receive signal analysis module for counting edges of a receive signal generated from a signal transmitted on the bus because of the transmit signal; and an evaluation module for evaluating the difference that results from a comparison of the edges counted by the transmit signal analysis module and the edges counted by the receive signal analysis module. If the signal propagation time on the bus is greater than the bit time of the receive signal, the evaluation module signals whether the amount of the difference is less than or equal to a predefined value or whether the amount of the difference is greater than the predefined value, the predefined value being greater than zero.

15 Claims, 5 Drawing Sheets

(56) References Cited

U.S. PATENT DOCUMENTS

| | | | | |
|---|---|---|---|---|
| 5,452,333 | A * | 9/1995 | Guo | H04L 1/205 327/175 |
| 5,818,895 | A * | 10/1998 | Oh | H03K 23/588 377/117 |
| 10,469,091 | B2 * | 11/2019 | Roham | H03L 7/1806 |
| 2002/0083376 | A1 * | 6/2002 | Self | G06F 11/0745 714/E11.004 |
| 2003/0218490 | A1 * | 11/2003 | Jang | G06F 1/04 327/291 |
| 2006/0050808 | A1 * | 3/2006 | Page | H04L 25/05 375/295 |
| 2006/0050825 | A1 * | 3/2006 | Page | H04L 7/0008 375/356 |
| 2007/0096836 | A1 * | 5/2007 | Lee | H03L 7/085 331/57 |
| 2010/0201405 | A1 * | 8/2010 | Ahmad | H02M 3/33561 327/108 |
| 2011/0038388 | A1 * | 2/2011 | Hartwich | H04L 7/0331 370/503 |
| 2014/0337549 | A1 * | 11/2014 | Hartwich | G06F 13/4282 710/106 |
| 2017/0063571 | A1 * | 3/2017 | Hehemann | H04L 12/413 |
| 2017/0070366 | A1 * | 3/2017 | Hehemann | H04L 25/0286 |
| 2017/0288807 | A1 | 10/2017 | Heinebrodt et al. | |
| 2018/0138899 | A1 * | 5/2018 | Tee | H03L 7/0992 |
| 2021/0399919 | A1 * | 12/2021 | Mutter | H04L 12/40032 |
| 2022/0060353 | A1 * | 2/2022 | Mutter | H04L 12/40013 |
| 2022/0209983 | A1 * | 6/2022 | Mutter | H04L 12/40013 |
| 2022/0239527 | A1 * | 7/2022 | Hartwich | H04L 12/40 |

FOREIGN PATENT DOCUMENTS

| | | |
|---|---|---|
| CN | 108353012 A | 7/2018 |
| DE | 102015209196 A1 | 3/2016 |
| EP | 0940950 A2 | 9/1999 |
| WO | 2019030081 A1 | 2/2019 |

* cited by examiner

DEVICE FOR A SUBSCRIBER STATION OF A SERIAL BUS SYSTEM AND METHOD FOR COMMUNICATION IN A SERIAL BUS SYSTEM

FIELD

The present invention relates to a device for a subscriber station of a serial bus system and to a method for communication in a serial bus system which operates at a high data rate and with great fault robustness.

BACKGROUND INFORMATION

At present, bus systems are frequently used in the communication between sensors and control units. Especially in vehicles, a bus system is often used in which data are transmitted as messages based on the ISO 11898-1:2015 standard as a protocol specification using CAN FD. The messages are transmitted between the bus subscribers of the bus system, e.g., a sensor, control unit, transmitter, and others.

It is frequently desired that technical systems offer more and more functions. This applies especially to vehicles. The increasing number of functions also causes an increase in the data traffic on the bus system. In addition, it is also often required that the data be transmitted from the transmitter to the receiver more rapidly than at present. As a consequence, there will be a further increase in the desired bandwidth of the bus system.

In order to allow for a transmission of data at a higher bit rate than in CAN, the CAN FD message format provided an option for switching to a higher bit rate within a message. In such techniques, the maximally possible data rate is increased beyond a value of 1 MBit/s through the use of a higher clock rate in the area of the data fields. Hereinafter, such messages are also referred to as CAN FD frames or CAN FD messages. In CAN FD, the useful data length is expanded from 8 to up to 64 bytes and the data transmission rates are considerably higher than in CAN.

For instance, one advantage of a CAN- or CAN FD-based communications network is its robustness with regard to errors. The communications network is furthermore able to react rapidly to changing operating states. This is of importance in particular in a vehicle so that the function of safety systems is rapidly implementable should the need arise.

However, such a network still has a considerably lower speed than a data transmission in a 100 base T1 ethernet, for example. In addition, the useful data length of up to 64 bytes currently achieved by CAN FD is too low for some applications.

SUMMARY

Therefore, it is an object of the present invention to provide a device for a subscriber station of a serial bus system and a method for communication in a serial bus system which solve the aforementioned problems. More specifically, a device for a subscriber station of a serial bus system and a method for communication in a serial bus system will be provided in which a high data rate and an increase in the amount of useful data per frame are able to be realized with great flexibility in the operation of a technical system using the bus system for the communication, and with a great error robustness of the communication.

The object may be achieved by a device for a subscriber station of a serial bus system in accordance with the present invention.

In accordance with an example embodiment of the present invention, the device has a transmit signal analysis module for counting edges of a transmit signal that is to be transmitted on a bus of the bus system in order to exchange a message between subscriber stations of the bus system; a receive signal analysis module for counting edges of a receive signal that is generated from a signal transmitted on the bus because of the transmit signal, in which the bus states of the signal for the message in a first communications phase differ from bus states of the signal received in a second communications phase; and an evaluation module for evaluating the difference that results from a comparison of the edges counted by the transmit signal analysis module and the edges counted by the receive signal analysis module, and in the event that the signal propagation time on the bus is greater than the bit time of the receive signal, the evaluation module is developed to signal whether the amount of the difference is less than or equal to a predefined value or whether the amount of the difference is greater than the predefined value, the predefined value being greater than zero.

The device makes it possible to detect a transmission conflict in the bus system without any special effort. The device is able to detect whether another subscriber or its transceiver simultaneously drives another bus state by its own subscriber station or its transceiver, that is to say, whether a conflict exists. In this way the advantages of CAN bus systems may be retained even when using such high bit rates at which the signal propagation time of the transmit signal TxD to the receive signal RxD is considerably greater than the length of a bit.

In the process, the device uses only two counters, which are clocked with the receive message Rx and the transmit message Tx and compared to each other in order to detect a transmission conflict on the bus. In this way, no direct comparison of the instantaneous values of receive message Rx and transmit message Tx is required. Such a direct comparison would require a measurement of the signal propagation time and the intermediate storage of a sequence of the last values of transmit message Tx for the evaluation by a protocol control unit and would therefore be quite complex.

Because of the embodiment of the device of the present invention, a transmission conflict is detectable even if both bus states are actively driven in one frame in the data phase. This also applies if a superposition of driven signals occurs on the bus so that "analog" levels come about on the bus and a transmission conflict is no longer reliably detectable by comparing transmit signal TXD and receive signal RXD because the resulting receive signal RXD is no longer accurately predictable. Because of the described device, an evaluation by a microcontroller or a protocol control unit in the device and/or by the communications control device may therefore be omitted.

The development of the device makes it possible for each subscriber station of the bus system to interfere with or interrupt the transmission of any other subscriber station by an error frame, if necessary. From the user standpoint, this is very advantageous because it can save time in an error case in that a currently transmitted message is aborted and other information is then able to be transmitted on the bus. This is very useful in particular with frames that are longer than a CAN FD frame having 64 bytes in the data phase, especially with frames that are to include 2-4 Kbytes or more.

As a result, the use of the device, which particularly is a transceiver, makes it possible to ensure the receiving of the frames with great flexibility with regard to current events in the operation of the bus system and at a low error rate even if the number of useful data per frame is increased. It is therefore also possible to communicate with great error robustness in the serial bus system even at a high data rate and an increase in the number of useful data per frame.

Thus, with the device in the bus system, it is particularly possible to retain an arbitration from CAN in a first communications phase and still considerably increase the transmission rate yet again in comparison with CAN or CAN FD.

This contributes to a realization of a net data rate of at least 10 Mbits per second. In addition, the size of the useful data per frame may be up to 4096 bytes or more.

In accordance with an example embodiment of the present invention, the method carried out by the device may also be used when at least one CAN FD-tolerant subscriber station, which is equipped according to the ISO 11898-1:2015 standard, is provided on the bus system, and/or at least one CAN FD subscriber station which transmits messages according to the CAN protocol and/or the CAN FD protocol.

Advantageous further embodiments of the device of the present invention are disclosed herein.

According to one exemplary embodiment of the present invention, the transmit signal analysis module has a counter for counting falling edges of the transmit signal, and the receive signal analysis module has a counter for counting falling edges of the receive signal.

According to another exemplary embodiment of the present invention, the transmit signal analysis module has a first counter for counting falling edges of the transmit signal and a second counter for counting rising edges of the transmit signal, and the receive signal evaluation module has a first counter for counting falling edges of the receive signal and a second counter for counting rising edges of the receive signal, the evaluation module being developed to evaluate the difference that results from a comparison of the edges counted by the first counters and to evaluate the difference that results from a comparison of the edges counted by the second counters.

According to one special embodiment variant of the present invention, in the event that the signal propagation time on the bus is lower than or equal to the bit time of the receive signal, the evaluation module is developed to signal whether the amount of the difference is equal to zero or whether the amount of the difference is greater than zero.

The evaluation module may possibly be developed to carry out the evaluation after the count value has been incremented by the receive signal analysis module, the evaluation module being developed to output the signaling of the evaluation at the connection of the device at which the receive signal is to be output from the device.

The transmit signal analysis module may be developed to use the transmit signal as a clock for the counting and to filter out overshoots at the edges of the transmit signal. In addition or as an alternative, the receive signal analysis module may be developed to use the receive signal as a clock for the counting and to filter out overshoots at the edges of the receive signal.

According to one special embodiment variant of the present invention, the bus states of the signal received from the bus in the first communications phase are generated by a different physical layer than the bus states of the signal received in the second communications phase.

In the first communications phase, it may possibly be negotiated which one of the subscriber stations of the bus system receives an at least intermittent exclusive, collision-free access to the bus in the following second communications phase.

In accordance with an example embodiment of the present invention, the device may furthermore have a transmitter module for transmitting messages onto a bus of the bus system, and the transmitter module is developed to switch between a first operating mode and a second operating mode during the transmission of the different communications phases of a message. In this context it is possible that in the first operating mode, the transmitter module is developed to generate a first data state as a bus state with different bus levels for two bus conductors of the bus line and to generate a second data state as a bus state with the same bus level for the two bus conductors of the bus line, and the transmitter module in the second operating mode is developed to generate the first and the second data state as a bus state with different bus levels for the two bus conductors of the bus line.

In addition, the device may have a receiver module for generating the receive signal from the signal received from the bus, the receiver module being developed to use a receive threshold in the first communications phase whose voltage value differs from a voltage value of a receive threshold in the second communications phase.

The above-described device may be part of a subscriber station for a serial bus system, which furthermore has a communications control device for controlling a communication of the subscriber station with at least one other subscriber station of the bus system. The device is connected to the communications control device in such a way that the signaling of the evaluation module is output to the communications control device.

In accordance with an example embodiment of the present invention, there is the option that the device is developed to signal the evaluation of the evaluation module to the communications control device by the receive signal or by a signal via a separate line in order to indicate a transmission conflict on the bus, and the communications control device is developed to generate or abort the transmit signal on the basis of the signal and/or to signal the transmission conflict to other subscriber stations of the bus system.

The above-described subscriber station may be part of a bus system that furthermore includes a bus and at least two subscriber stations, which are connected to one another via the bus in such a way that they are able to serially communicate with one another. At least one of the two subscriber stations is an above-described subscriber station.

The above-mentioned objective may furthermore be achieved by a method for communication in a serial bus system in accordance with the present invention. In accordance with an example embodiment of the present invention, the method has the steps of counting, using a transmit signal analysis module, edges of a transmit signal that is to be transmitted on a bus of the bus system in order to exchange a message between subscriber stations of the bus system; counting, using a receive signal analysis module, edges of a receive signal that is generated from a signal transmitted on the bus because of the transmit signal, in which the bus states of the signal for the message in a first communications phase differ from bus states of the signal received in a second communications phase; and evaluating, using an evaluation module, the difference that results from a comparison of the edges counted by the transmit signal analysis module and the edges counted by the receive signal analysis module; signaling, using the evaluation module, in the event that the signal propagation time on the bus is greater than the bit time of the receive signal, whether the amount of the difference is less than or equal to a predefined value, or whether the amount of the difference is greater than the predefined value, the predefined value being greater than zero.

The method offers the same advantages as those mentioned above in connection with the device and/or the subscriber station.

Additional possible implementations of the present invention also include not explicitly mentioned combinations of features or embodiments described in the previous or following text with regard to the exemplary embodiments. One skilled in the art will also add individual aspects as improvements or supplementations to the respective basic form of the present invention, in view of the disclosure herein.

BRIEF DESCRIPTION OF THE DRAWINGS

In the following text, the present invention will be described in greater detail with reference to the figures and based on exemplary embodiments.

Unless otherwise indicated, identical or functionally equivalent elements in the figures have been provided with the same reference numerals.

DETAILED DESCRIPTION OF EXAMPLE EMBODIMENTS

Figure 1:
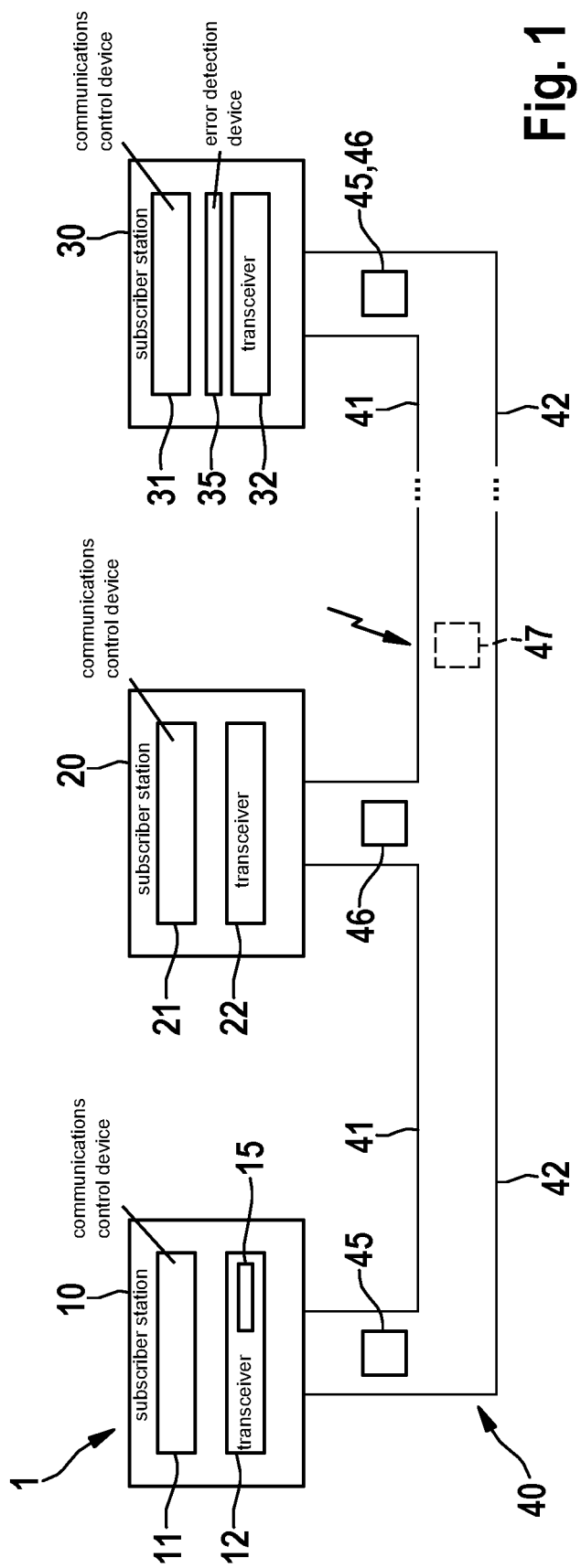
FIG. 1 shows a simplified circuit diagram of a bus system according to a first exemplary embodiment of the present invention.

As an example, FIG. 1 shows a bus system 1, which in particular is basically configured for a CAN bus system, a CAN FD bus system, a CAN XL bus system and/or variations thereof as will be described in the following text. Bus system 1 may be used in a vehicle, in particular a motor vehicle, an airplane, etc. or in a hospital, etc.

In FIG. 1, bus system 1 has a multitude of subscriber stations 10, 20, 30, which are connected to a bus 40 in each case via a first bus conductor 41 and a second bus conductor 42. Bus conductors 41, 42 may also be referred to as CAN_H and CAN_L or CAN-XL_H and CAN-XL_L and are used for an electrical signal transmission after coupling the differential levels or generating recessive levels for a signal in the transmission state. Messages 45, 46 in the form of signals are serially transmittable via bus 40 between the individual subscriber stations 10, 20, 30. If an error occurs during the communication on bus 40, as illustrated by the jagged black block arrow in FIG. 1, then an error frame 47 (error flag) can be transmitted. Subscriber stations 10, 20, 30, for example, are control units, sensors, display devices, etc. of a motor vehicle.

As illustrated in FIG. 1, subscriber station 10 has a communications control device 11, a transceiver 12, and an error detection device 15. Subscriber station 20, on the other hand, has a communications control device 21 and a transceiver 22. Subscriber station 30 has a communications control device 31, a transceiver 32 and an error detection device 35. Transceivers 12, 22, 32 of subscriber stations 10, 20, 30 are directly connected to bus 40 in each case even if this is not illustrated in FIG. 1.

Communication control devices 11, 21, 31 are used for the control of a communication of respective subscriber station 10, 20, 30 via bus 40 with at least one other subscriber station of subscriber stations 10, 20, 30 connected to bus 40.

Communications control device 11 prepares and reads first messages 45 which are modified CAN messages 45, for instance. Modified CAN messages 45 are structured on the basis of a CAN XL format, which is described in greater detail with regard to FIG. 2.

Communications control device 21 may be developed like a conventional CAN controller according to ISO 11898-1: 2015. Communications control device 21 prepares and reads second messages 46 such as classic CAN messages 46. Classic CAN messages 46 are structured according to the classic basic format in which up to 8 data bytes may be included in message 46. Alternatively, a classic CAN message 46 is set up as a CAN FD message which may include up to 64 data bytes, which are furthermore transmittable at a considerably faster data rate than in a classic CAN message 46. In the latter case, communications control device 21 is developed like a conventional CAN FD controller.

Depending on the requirements, communications control device 31 may be developed to supply a CAN XL message 45 or a classic CAN message 46 for transceiver 32 or to receive such a message from transceiver 32. Communications control device 31 thus prepares and reads a first message 45 or a second message 46, which differ by their data transmission standard, in this case, CAN XL or CAN. Alternatively, classic CAN message 46 is set up like a CAN FD message. In the latter case, communications control device 31 is embodied like a conventional CAN FD-controller.

With the exception of the differences still to be described in greater detail in the following text, transceiver 12 may be developed as a CAN XL transceiver. Transceiver 22 may be developed like a conventional CAN transceiver or a CAN FD transceiver. Depending on the requirements, transceiver 32 can be developed to supply messages 45 for communications control device 31 according to the CAN XL format or messages 46 according to the current CAN basic format or to receive such therefrom. Transceivers 12, 32 may additionally or alternatively be developed like a conventional CAN FD transceiver.

With the aid of the two subscriber stations 10, 30, messages 45 can be created and then transmitted using the CAN XL format and such messages 45 are also able to be received.

Figure 2:
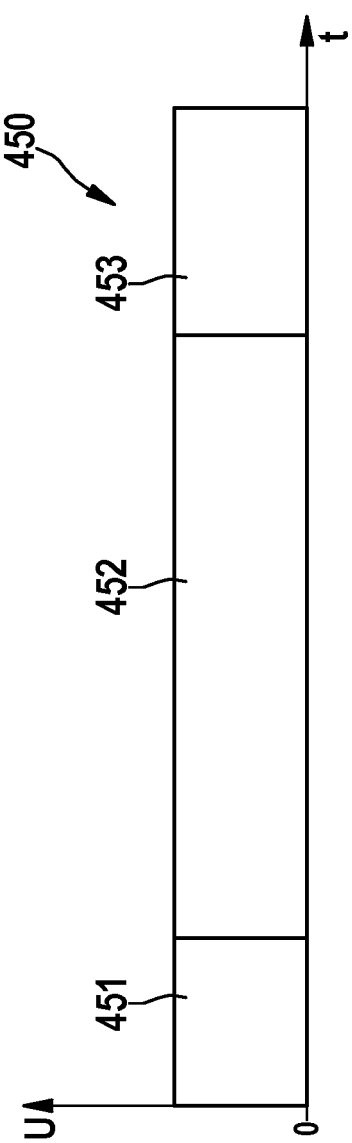
FIG. 2 shows a diagram to illustrate the structure of messages able to be transmitted by a transceiver for a subscriber station of the bus system according to the first exemplary embodiment of the present invention.

FIG. 2 shows a CAN XL frame 450 for message 45 as it is transmitted by transceiver 12 or transceiver 32. CAN XL frame 450 is subdivided into different communications phases 451 to 453 for the CAN communication on bus 40, i.e., an arbitration phase 451, a data phase 452, and an end-of-frame phase 453.

In arbitration phase 451, a negotiation takes place between subscriber stations 10, 20, 30 with the aid of an identifier in a bitwise manner as to which subscriber station 10, 20, 30 wants to transmit message 45, 46 at the highest priority and thus receives exclusive access to bus 40 of bus system 1 next time for the transmission in subsequent data phase 452.

In data phase 452, the useful data of CAN XL frame or message 45 are transmitted. The useful data may have up to 4096 bytes, for instance, or a higher value according to the value range of a data length code.

Included in end-of-frame phase 453, e.g., in a check sum field, may be a check sum about the data of data phase 452 including the stuff bits, which the transmitter of message 45 inserts as an inverse bit after a predefined number of similar bits, in particular 10 similar bits. In addition, at least one acknowledgement bit may be included in an end field in end-of-frame phase 453. A sequence of 11 similar bits may furthermore be present that indicates the end of CAN XL frame 450. Using the at least one acknowledgement bit, it can be indicated whether or not a receiver has discovered an error in received CAN XL frame 450 or message 45.

In arbitration phase 451 and end-of-frame phase 453, a physical layer as in CAN and CAN FD is used. The physical layer corresponds to the bit transmission layer or layer 1 of the conventional OSI model (Open System Interconnection model).

An important point during phases 451, 453 is that the conventional CSMA/CR method is used, which allows for simultaneous access of subscriber stations 10, 20, 30 to bus 40 without destroying the higher-prioritized message 45, 46. This makes it relatively easy to add further bus subscriber stations 10, 20, 30 to bus system 1, which is very advantageous.

The CSMA/CR method means that what is known as recessive states must exist on bus 40, which are able to be overwritten with dominant states by other subscriber stations 10, 20, 30 on bus 40. In the recessive state, high-impedance conditions prevail at the individual subscriber station 10, 20, 30, which in combination with the parasites of the bus circuitry result in longer time constants. This leads to a restriction of the maximum bit rate of the current CAN FD physical layer to presently approximately 2 megabits per second in an actual vehicle use.

A transmitter of message 45 starts a transmission of bits of data phase 452 on bus 40 only when subscriber station 10 as the transmitter has won the arbitration and subscriber station 10 as the transmitter thus has exclusive access to bus 40 of bus system 1.

Quite generally, compared to CAN or CAN FD, the following deviating characteristics are able to be realized in the bus system with CAN XL:

a) Adopting and possibly adapting proved and tested characteristics that are responsible for the robustness and application ease of CAN and CAN FD, in particular the frame structure with identifier and arbitration according to the CSMA/CR method,
b) Increasing the net data transmission rate to approximately 10 megabits per second,
c) Increasing the size of the useful data per frame to approximately 4 Kbytes.

Figure 3:
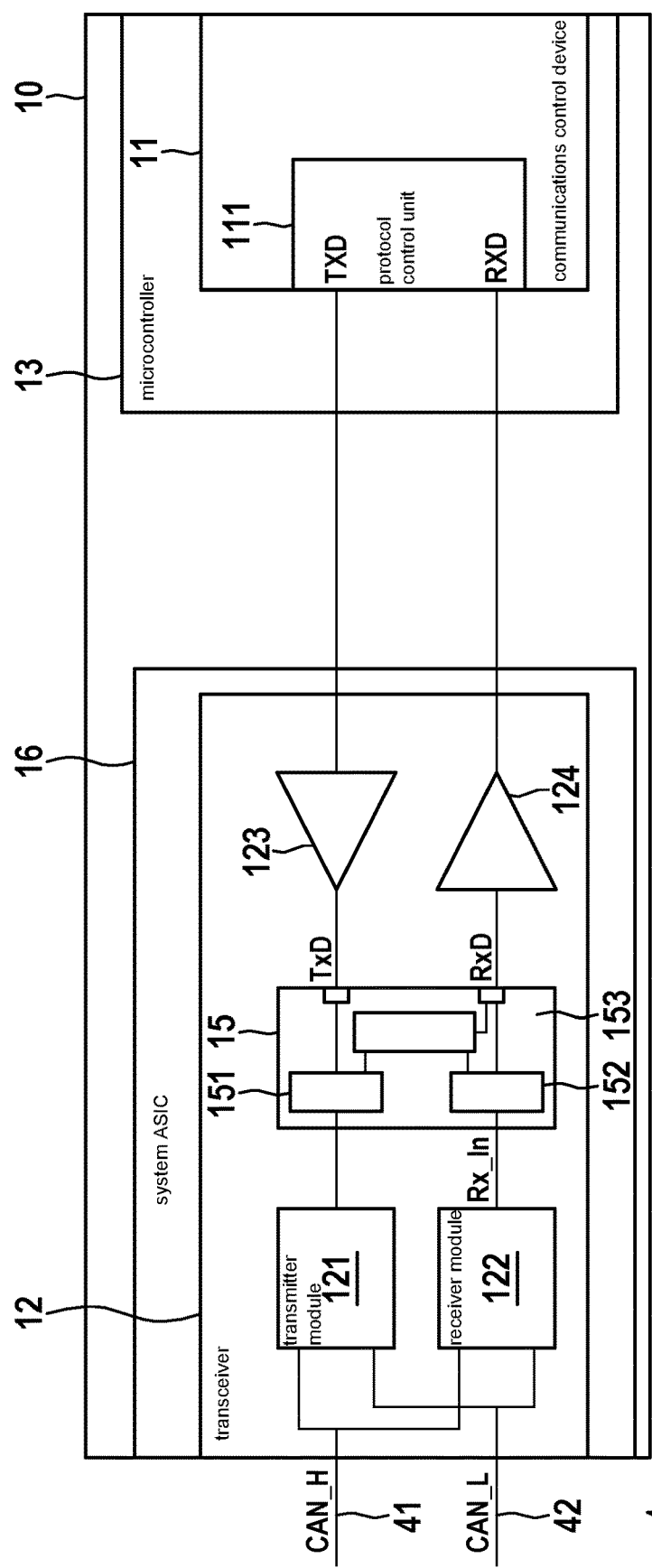
FIG. 3 shows a simplified schematic circuit diagram of a subscriber station of the bus system according to the first exemplary embodiment of the present invention.

FIG. 3 shows the basic structure of subscriber station 10 having communication control device 11, transceiver 12 and error detection device 15. Subscriber station 30 has a similar development to that shown in FIG. 3, with the exception that error detection device 35 is not integrated into transceiver 32 but is provided separately from communications control device 31 and transceiver 32. For that reason, subscriber station 30 and error detection device 35 will not be described separately. The functions of device 15 described in the following text are provided identically in device 35.

According to FIG. 3, in addition to communications control device 11, transceiver 12 and device 15, subscriber station 10 also has a microcontroller 13 to which communications control device 11 is allocated, and a system ASIC 16 (Application-Specific Integrated Circuit), which alternatively may be a system basic chip (SBC) on which multiple functions required for an electronics module of subscriber station 10 are combined. Apart from transceiver 12, an energy supply device (not shown), which supplies electrical energy to transceiver 12, is installed in system ASIC 16. The energy supply device usually supplies a voltage CAN_supply of 5V. Depending on the requirements, however, a different voltage having a different value may be supplied by the energy supply device. Additionally or alternatively, the energy supply device may be developed as a current source.

Error detection device 15 has a transmit signal analysis module 151, a receive signal analysis module 152, and an evaluation unit 153. Transmit signal analysis module 151 is particularly developed as at least one first counter. Receive signal analysis module 151 is particularly developed as at least one second counter.

Transceiver 12 furthermore has a transmitter module 121, a receiver module 122, a transmit signal driver 123 and a receive signal driver 124. Even if the following text always refers to transceiver 12, it is alternatively possible to provide receiver module 122 with its receive signal driver 124 in a separate device, externally to transmitter module 121 with its transmit signal driver 123. Transmitter module 121 and receiver module 122 as well as transmit signal driver 123 and receive signal driver 124 may have the structure of a conventional transceiver 22. Transmitter module 121 may particularly have at least one operational amplifier and/or one transistor. Receiver module 122 may especially have at least one operational amplifier and/or one transistor.

Transceiver 12 is connected to bus 40, more precisely, to its first bus conductor 41 for CAN_H or CAN-XL_H and its second bus conductor 42 for CAN_L or CAN-XL_L.

First and second bus conductors 41, 42 in transceiver 12 are connected not only to transmitter module 121, also referred to as a transmitter, but also to receiver module 122, also referred to as a receiver. First and second bus conductors 41, 42 in transceiver 12 are also connected to device 15 even if the connection is not shown in FIG. 3 for reasons of clarity.

Figure 4:
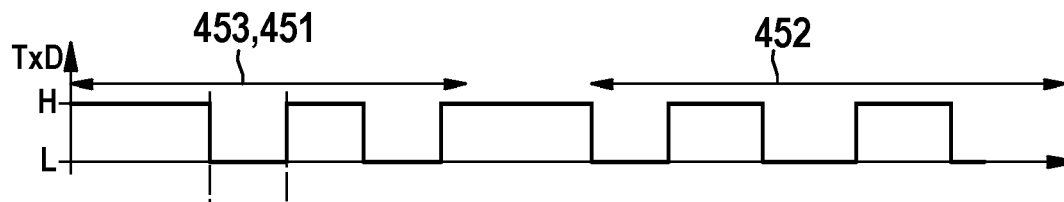
FIG. 4 shows an example of a time characteristic of a transmit signal TxD, which a subscriber station of the bus system according to the first exemplary embodiment of the present invention transmits onto a bus of the bus system.
Figure 5:
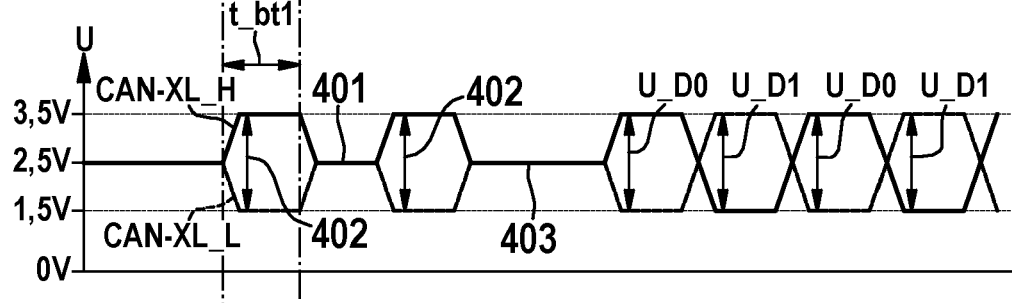
FIG. 5 shows a time characteristic of bus signals CAN-XL_H and CAN-XL_L, which come about on the bus in a normal operation as a result of transmit signal TxD of FIG. 4.

While bus system 1 is in operation, transmitter module 121 converts a transmit signal TXD or TxD of communications control device 11 according to FIG. 4 into corresponding signals CAN-XL_H and CAN-XL_L according to FIG. 5 for bus conductors 41, 42 and transmits these signals CAN-XL_H and CAN-XL_L at the connections for CAN-XL_H and CAN-XL_L onto bus 40, as illustrated in FIG. 3. The signals of FIG. 5 cause a differential voltage VDIFF=CAN-XL_H−CAN-XL_L to form on bus 40, which is illustrated in FIG. 6.

Figure 6:
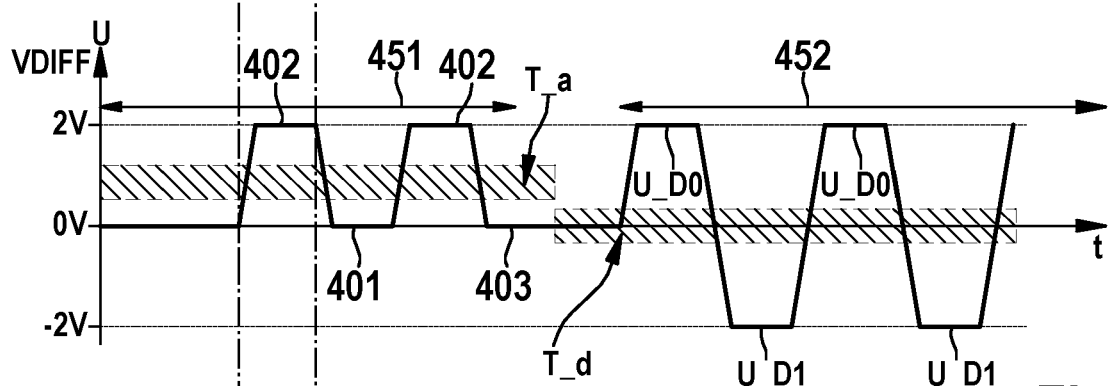
FIG. 6 shows a time characteristic of a differential voltage VDIFF, which results from the bus signals CAN-XL_H and CAN-XL_L of FIG. 5.
Figure 7:
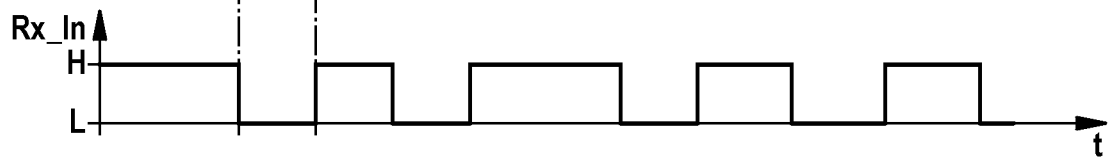
FIG. 7 shows a time characteristic of a receive signal Rx_In, which a subscriber station of the bus system receives from the bus and/or generates from the signals from FIG. 5 and FIG. 6.

Receiver module 122 uses the CAN-XL_H and CAN-XL_L signals received from bus 40 according to FIG. 5 or their differential voltage VDIFF according to FIG. 6 to form a receive signal Rx_In as illustrated in FIG. 7, and outputs it to error detection device 15, which forwards signal Rx_In in a normal operation as an RXD or RxD signal to communications control device 11, as illustrated in FIG. 3. Receive signal Rx_In is forwarded in arbitration phase 451 as signal RxD. However, if subscriber station 10 is a transmitter in data phase 452, then it is not forwarded as signal RxD in at least one embodiment variant, that is to say, when a possible conflict is signaled via the RxD line. In such a case, receive signal Rx_In then is known only internally in transceiver 12, possibly only in receiver module 122 and device 15. Protocol control unit 111 simply needs to know whether or not a conflict exists or whether its bits are transmitted without any problems via connection TXD.

With the exception of an idle or standby state, transceiver 12 with receiver module 122 always listens for a transmission of data or messages 45, 46 on bus 40 during a normal operation, and does so regardless of whether or not transceiver 12 is a transmitter of message 45.

Even if this is not explicitly indicated in FIGS. 4 to 7, the bit rate in phases 451, 453, i.e., in an arbitration and end-of-frame, has a value of maximally 1 Mbit/s. On the other hand, the bit rate in data phase 452 may have the same value as illustrated in FIG. 4 to FIG. 7 or a higher value, especially 8 Mbit/s or 10 Mbit/s or even higher. In such a case, a bit time t_bt1 in phases 451, 453 is considerably longer than a bit time t_bt2 in data phase 452.

According to the example of FIG. 5, CAN-XL_H and CAN-XL_L signals in the above-mentioned communications phases 451, 453 have the dominant and recessive bus levels 401, 402, as from CAN. In contrast, the CAN-XL_H and CAN-XL_L signals in data phase 452 differ from conventional signals CAN_H and CAN_L, as will be described in greater detail in the following text.

As may be gathered from the left part of FIG. 5, transmitter module 121 drives dominant states 402 of differential signals CAN-XL_H and CAN-XL_L differently only in the above-mentioned communications phases 451, 453. In contrast, the bus levels on bus line 3 for recessive states 401 in the above-mentioned communications phases 451, 453 are equal to voltage Vcc or the CAN_supply of 2.5V, for instance. Thus, a value of 0V results for a voltage VDIFF=CAN-XL_H−CAN-XL_L for recessive states 401 (logical '1' or H of transmit signal TxD), and a value of approximately 2.0V for dominant states 402 (logical '0' or L of transmit signal TxD).

If transceiver 12, in particular its device 15, detects the end of arbitration phase 451, then transmitter module 121 is switched for data phase 452 from the state shown in the left part of FIG. 4 to a state shown in the right part of FIG. 4. Transmitter module 121 thus is switched from a first operating mode (arbitration phase 451—classic CAN) to a second operating mode (data phase 452 as a transmitter of message 45) or to a third operating mode (data phase 452 as a receiver but not a transmitter of message 45). The second and the third operating modes differ in the following way.

In the third operating mode, the receiving subscriber station does not switch its bus driver or its transmitter module 121, but outputs only "recessive", i.e., bus state 401, or does not drive CAN bus 40. In addition, the receiving subscriber station switches its sampling threshold for VDIFF to threshold T_d. There is no need for a receiving subscriber station to detect a conflict because it does not transmit anything. Instead, a receiving subscriber station naturally requires the RxD input signal.

In the second operating mode, on the other hand, the transmitting subscriber station always actively drives one of two levels U_D0, U_D1. In addition, the transmitting subscriber station may ignore current input signal Rx_In or RxD as long as the bit errors are reported to communications control device 11. In this particular exemplary embodiment, only the second operating mode is examined (data phase 452 as a transmitter of message 45).

In the possibly faster data phase 452, bus states U_D0, U_D1 according to data states Data_0 or L and Data_1 or H of transmit signal TXD of FIG. 4 come about for CAN-XL_H, CAN-XL_L signals because of transmit signal TxD in the right part of FIG. 4 according to FIG. 5.

The sequence of data states Data_0 or L and Data_1 or H in transmit signal TxD of FIG. 4 and thus bus states U_D0, U_D1 resulting therefrom for CAN-XL_H, CAN-XL_L signals in FIG. 5 and the resulting characteristic of voltage VDIFF of FIG. 6 serve only to illustrate the function of transceiver 12. The sequence of data states Data_0 or L and Data_1 or H in transmit signal TxD and thus the bus states U_D0, U_D1 is selectable according to the requirements.

In the above-described states, bus levels ranging from approximately −0.6V to approximately −2V exist on the bus line of bus 40 at the state Data_0, and bus levels ranging from approximately 0.6V to approximately 2V exist at the state Data_1. At the states Data_0 and Data_1, differential voltage has VDIFF=CAN-XL_H−CAN-XL_L, i.e., in particular a maximum amplitude of approximately 1.4V, even if FIG. 6 shows an amplitude for VDIFF as 2V in a special example.

In other words, in a first operating mode according to FIG. 4, transmitter module 121 generates a first data state such as Data_0 or L as bus state 402 with different bus levels for two bus conductors 41, 42 of the bus line, and a second data state such as Data_1 or H as bus state 401 with the same bus level for the two bus conductors 41, 42 of the bus line of bus 40.

In addition, for the time characteristics of signals CAN-XL_H, CAN-XL_L in a second operating mode, which includes data phase 452, transmitter module 121 forms first and second data state Data_0, Data_1 as bus state U_D0, U_D1 with different bus levels in each case for the two bus conductors 41, 42 of the bus line of bus 40. This is shown in FIG. 5 and FIG. 6.

As illustrated in FIG. 6, receiver module 122 uses the first receive threshold T_a, from CAN/CAN-FD, in communications phases 451, 453, especially with the typical level of 0.7V according to ISO11898-2:2016, in order to be able to detect bus states 401, 402 in a reliable manner in the first operating mode. In contrast, receiver module 122 uses a receive threshold T_d which lies at approximately 0V in data phase 452.

FIG. 8 through FIG. 12 show a signal characteristic of signals TxD1, TxD2 and of signals CAN-XL_H, CAN-XL_L for data phase 452, their differential voltage VDIFF=CAN-XL_H−CAN-XL_L and the resulting receive signal RxD. In the case illustrated in FIG. 8 to FIG. 12, for example, transmitter module 121 transmits transmit signal TxD1 from FIG. 8 for a frame 450; and subscriber station 30, for example, which is actually only the receiver of frame 450 in data phase 452, wants to achieve an abort of frame 450 and therefore transmits transmit signal TxD2 from FIG. 9.

There are various reasons why an abort of frame 450 is to take place such as:

subscriber station 30 as an RX subscriber station has to transmit a message 45, 46 with a higher priority, and/or subscriber station 30 as an RX subscriber station has detected an error in the header check sum (CRC=Cyclic Redundancy Check) of CAN XL message 45 and would like to signal this fact, and/or subscriber station 20, which is a CAN FD subscriber station, has possibly not recognized the switchover to the format of frame 450 due to a bit error and transmits an error frame 47 during data phase 452 of frame 450.

Figure 8:
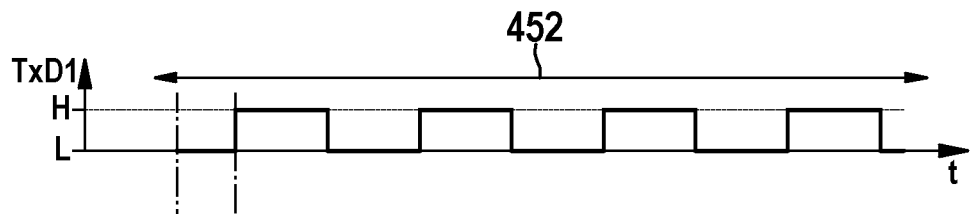
FIG. 8 shows an example of a time characteristic of a transmit signal TxD1 in a data phase of a message that is transmitted by a first subscriber station of the bus system according to the first exemplary embodiment of the present invention.
Figure 9:
FIG. 9 shows an example of a time characteristic of a transmit signal TxD2 that is transmitted by another subscriber station for aborting the transmit signal TxD1 of FIG. 8.
Figure 10:
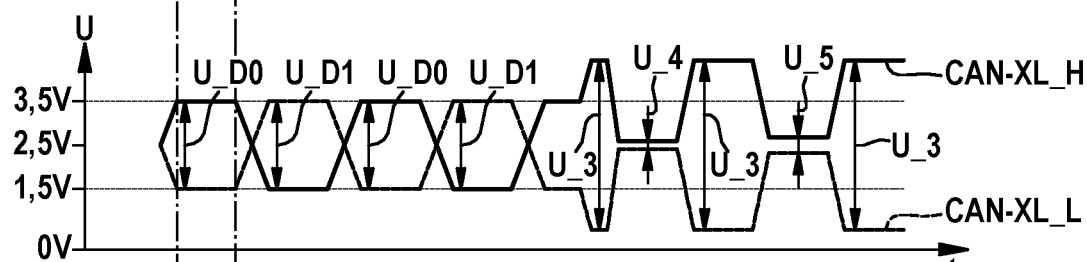
FIG. 10 shows a time characteristic of bus signals CAN-XL_H and CAN-XL_L that come about on the bus because of transmit signals TxD1, TxD2 of FIG. 8 and FIG. 9.

For example, if subscriber station 30 wants to obtain an abort of frame 450 which transmitter module 121 transmits to subscriber station 10 by signal TxD1 from FIG. 8, then subscriber station 30 transmits transmit signal TxD2 according to FIG. 9 to bus 40. As a result, the signal characteristics for CAN-XL_H and CAN-XL_L and their differential voltage VDIFF come about. In phase 455 of transmitting error frame 47, which starts with the falling edge of transmit signal TxD2, voltage states thus result on bus 40 that deviate from the voltage states on bus 40 during a normal operation of data phase 452 and which have been described above with reference to FIG. 4 to FIG. 7.

Quite generally, it is the case that the transmitting subscriber station sending transmit signal TxD1 switches to an operation in data phase 452 in which both logic levels of transmit signals TxD, TxD1, TxD2 are driven onto bus 40 at different differential voltages. In contrast, receive threshold Td is switched on for all receiving subscriber stations such as subscriber station 30 in the mentioned example. However, the bus driver of receiving subscriber station 30 remains in the receiving state (CAN-recessive-state) until receiving subscriber station 30 possibly sends error frame 47, as illustrated in FIG. 9 and mentioned above for transmit signal TxD2. Error frame 47 according to the right part of FIG. 9 may then be sent as "dominant" or as differential voltage VDIFF for logic level '0'. Because both alternatives are possible, the two states in FIG. 9 for transmit signal TxD2 are denoted by P for passive and A for active. For an interoperability with CAN/CAN-FD, error frame 47 is selectable by lining up 6 or more bits (depending on the bit stuffing method) with a positive VDIFF.

In FIG. 9 error frame 47 begins with the falling edge at TxD2 at an instant t1. As a result of what is denoted as phase 455 in FIG. 9, the transient characteristic of differential voltage VDIFF in FIG. 11 changes significantly. As schematically illustrated in FIG. 12 by elliptical region 50, this may lead to an unrecognized recessive pulse at receive signal Rx_In.

Figure 11:
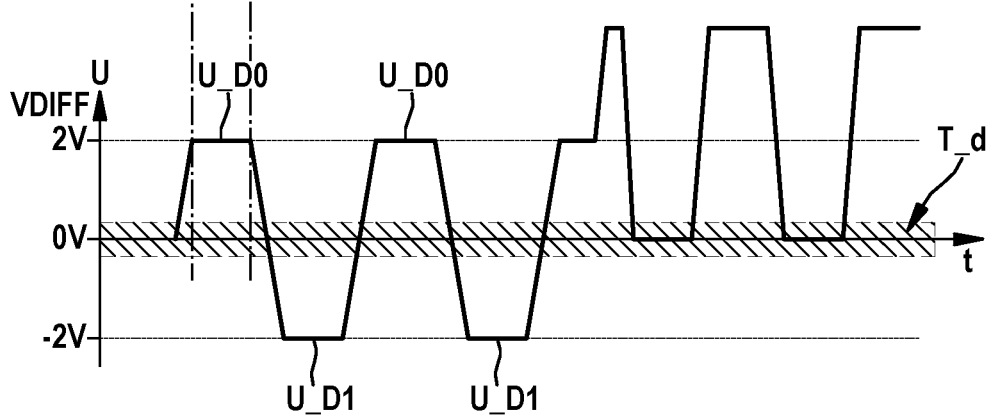
FIG. 11 shows a time characteristic of a differential voltage VDIFF, which results from bus signals CAN-XL_H and CAN-XL_L of FIG. 10.
Figure 12:
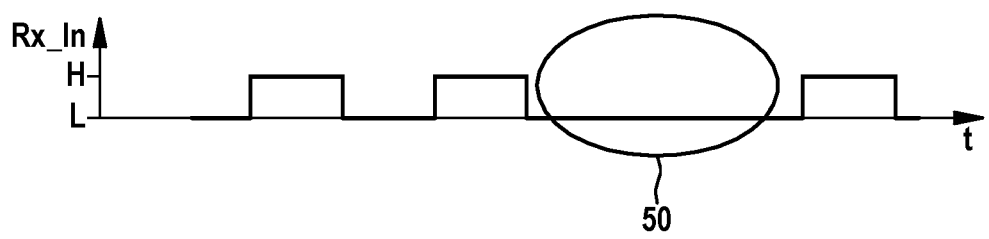
FIG. 12 shows a time characteristic of a receive signal Rx_In, which a subscriber station of the bus system receives from the bus or generates from the signals of FIG. 10 and FIG. 11.

Going beyond the illustration in FIG. 11, differential voltage VDIFF in a real case is also superposed by high-frequency oscillations, which are defined by the bus topology, phase position and impedance of subscriber station 10, 20, 30 transmitting error frame 47.

Since certain errors on bus 40 are unable to be detected even with additional receive thresholds in data phase 452, error detection device 15 is provided.

With the aid of transmit signal analysis module 151, error detection device 15 detects signal TxD, which, coming from communications control device 11, more precisely, its protocol control unit 111, is provided by TxD driver 123. Thus, the mentioned signal TxD may be either signal TxD from FIG. 4 or signal TxD1 from FIG. 8 or signal TxD2 from FIG. 9. In addition, using its receive signal analysis module 152, error detection device 15 detects the Rx_In output signal of receiver module 122, as shown in FIG. 8 or FIG. 12, for example. The RxD output signal is then made available via RxD driver 124 for communications control device 11, more precisely, its protocol control unit 111.

In the process, transmit signal analysis module 151 counts the number of edges of signal TxD, in particular each falling edge. Each edge on transmit signal TxD is implemented on bus 40 and received again and detected by receiver module 122 of respective subscriber station 10, 20, 30. Receive signal analysis module 152 counts the number of edges of signal RxD, in particular each falling edge.

The counting of the edges by modules 151, 152 may be clocked using signals Rx_In and TxD. For instance, modules 151, 152 may increment their edge count value with each falling edge. When using signals Rx_In and TxD as the clock, modules 151, 152 and/or device 15 may have at least one filter module which filters out overshoots at the edges through suitable measures. The at least one filter module may particularly be or have a Schmitt trigger and/or a low-pass filter.

Evaluation module 153 forms the difference of the two count values of the edges of module 151, 152. In this way, the two counter readings or count values of modules 151, 152 are compared to each other. The check instant or the evaluation instant by evaluation module 153 is specified to the instant after the RxD increment. If the signal propagation time is less than the bit length, the count values of modules 151, 152 at the check instant or the evaluation instant by evaluation module 153 are identical. If the signal propagation time is greater than the bit length, the signal propagation time is compensated by tolerating a small difference between the count values of modules 151, 152. The tolerated difference, which may also be referred to as a tolerance value, is configurable in evaluation module 153 as a function of the signal propagation time and bit length. For instance, at a signal propagation time of max. 250 ns from transmit signal TXD to the receiving of receive signal RX_In at device 12 and a bit time t_bt2 of 100 ns, the tolerated difference≤3. The difference may be specified as any natural number N that is equal to or greater than 1.

In other words, in a fault-free normal case, the difference of the two count values of the edges of module 151, 152 is zero.

If the difference is not equal to zero, then this points to an interruption or an error. Such an interruption or error may particularly occur on account of an error frame 47 of another subscriber station 10, 20, 30, as described above. This is because transmitter 121 then no longer has exclusive, collision-free access to bus 40 in data phase 452.

Device 15 thus detects a conflict on bus 40 if the difference between the two count values of modules 151, 152 is greater than the allowed tolerance value at the evaluation instant.

The conflict is then reported to communications control device 11, more precisely, its protocol control unit 111. In this particular exemplary embodiment, the RxD connection is used for this purpose during data phase 452. The transmitter of CAN XL frame 450 then expects a constant H level (high level) at the RxD connection in a conflict-free operation, for example. However, if device 15 detects a conflict, an L level (low level), for instance, is output at the RxD connection in order to report the conflict to communications control device 11, more precisely, to its protocol control unit 111. It is of course possible to signal the conflict by a different signal pattern via the RxD connection.

As a result, device 15 does not need a protocol control unit of its own but the already present protocol control unit 111 of communications control device 11 suffices. This is a great advantage over an implementation in which evaluation unit 153 directly compares the two signals to each other in order to detect that an error frame 47 is sent by another node in a deviation between the two signals TxD, Rx_In. In such a comparison of the two signals TxD, Rx_In, the signal propagation time, in particular on bus 40, would have to be taken into account, i.e., compensated, because at a bit rate of 10 Mbit/s, for example, the bit time amounts to 100 ns, which is below the signal propagation time of up to 250 ns. This would require an additional protocol control unit 111 in device 15.

In data phase 452, communications control device 11 reacts to the signaled transmission conflict by aborting data phase 452 and possibly additionally by transmitting a bit pattern that signals the end of data phase 452 to the other subscriber stations 20, 30.

A particular advantage of the above-described variants of the evaluation is that the embodiment of receiver 122 or transceiver 12 is able to be used both for homogeneous CAN XL bus systems, in which only CAN XL messages 45 and no CAN FD messages 46 are transmitted, and for mixed bus systems, in which either CAN XL messages 45 or CAN FD messages 46 are transmitted. Transceiver 12 is therefore universally usable.

Figure 13:
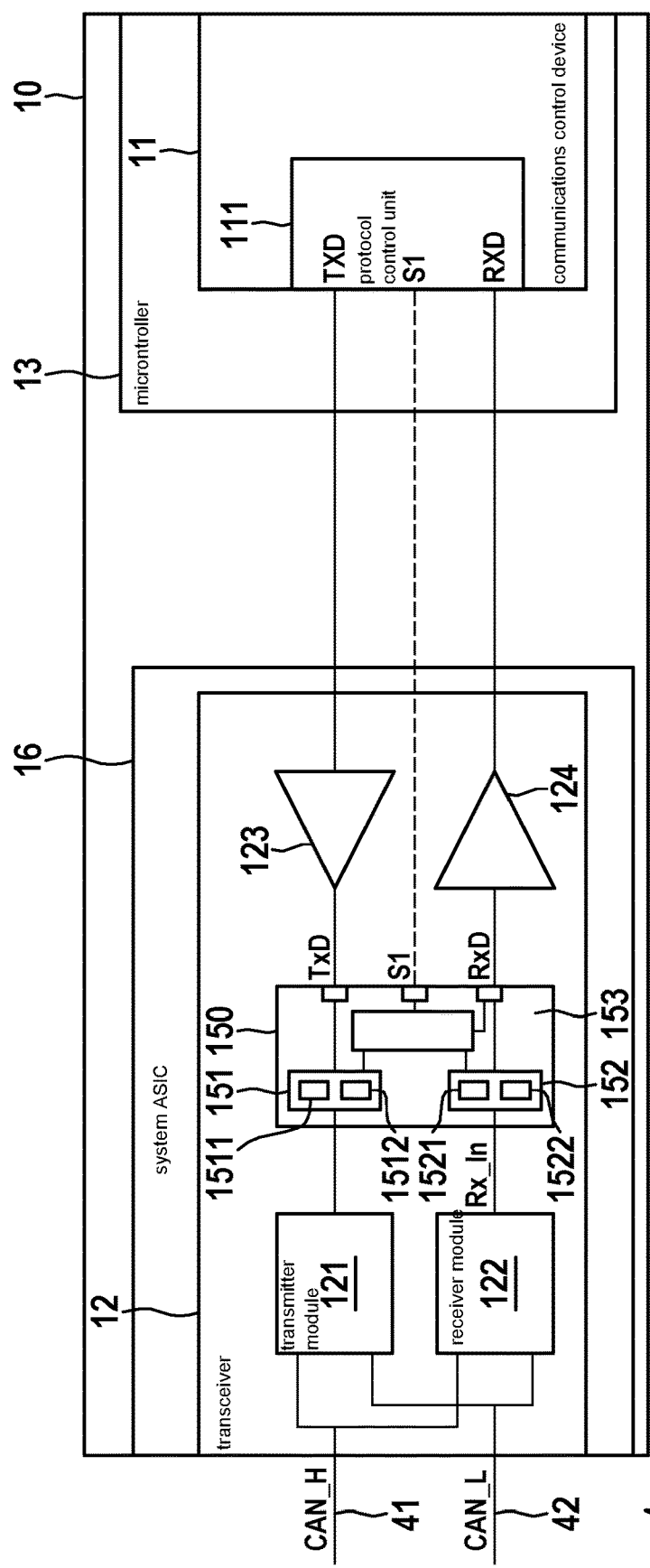
FIG. 13 shows a simplified schematic block diagram of a subscriber station of the bus system according to a second exemplary embodiment of the present invention.

FIG. 13 illustrates an embodiment of an error detection device 150 for transceiver 12 according to a second exemplary embodiment. With the exceptions described in the following text, error detection device 150 is developed like an error detection device 15 according to the preceding exemplary embodiment.

According to FIG. 13, error detection device 150 in module 151 has a first and a second counter 1511, 1512. In addition, module 152 has a first and a second counter 1521, 1522.

With the aid of first counter 1511, module 151 detects falling edges of transmit signal TxD. With the aid of second counter 1512, module 151 detects rising edges of transmit signal TxD. Using first counter 1521, module 152 detects falling edges of receive signal Rx_In. Using second counter 1522, module 152 detects rising edges of receive signal Rx_In.

As a result, evaluation module 153 is able to compare the count values of counters 1511, 1521, that is to say, the number of falling edges in signals TxD, Rx_In. Additionally or alternatively, evaluation module 153 is able to compare the count values of counters 1512, 1522, that is to say, the number of rising edges in signals TxD, Rx_In. Additionally or alternatively, evaluation module 153 is able to compare the count values of counters 1512, 1522, or in other words, the number of falling edges in signal TxD and the number of falling edges in signal Rx_In. In addition or as an alternative, evaluation module 153 is able to compare the count values of counters 1512, 1522, i.e., the number of falling edges and the number of rising edges in signal TxD. Additionally or alternatively, evaluation module 153 is able to compare the count values of counters 1521, 1522, i.e., the number of falling edges and the number of rising edges in signal Rx_In. A tolerance value is able to be configured for each comparison.

This allows for an even further plausibilization of the existence of a transmission conflict on bus 40. It may be distinguished between the conflict case of a transmission of an error frame 47 (error flag) and the conflict case of the transmission because of the undetected lost arbitration.

As a result, it can be signaled in receive signal RXD and/or signal S1 to communications control device 11 which transmission conflict has occurred. If receive signal Rx_In is also to be forwarded in a conflict case in data phase 452 as signal RxD, then the possible conflict is signaled only by signal S1 but not signaled via the RxD line. In other words, if Rx_In is always to be forwarded to communications control device 11, then an additional line is required to signal the conflict.

Communications control device 11 is therefore able to carry out not only the aborting of data phase 452 but, if warranted, can additionally signal to the other subscriber stations 20, 30 the end of data phase 452 by the transmission of a bit pattern, and optionally provide information about the type of transmission conflict.

Alternatively or additionally, evaluation module 123 or some other module of transceiver 12 is able to generate a separate signal S1, which is transmitted via a separate signal line to communications control device 11 and which in particular has at least one switching pulse or a predefined bit pattern for signaling the conflict. Because the transmission conflict is signaled to communications control device 11 in data phase 452, the conventional bit error check in the classic CAN by comparing transmit signal TXD to receive signal RXD is able to be replaced by a check of the conflict-signaling signal. The conflict-signaling signal in particular has a predefined bit pattern that signals the transmission conflict. In particular, the conflict-signaling signal may transmit a '1' as an "OK signal" and an '0' as a "conflict report".

All above-described embodiments of devices 15, 35 of subscriber stations 10, 20, 30 of bus system 1 and the method carried out therein may be used individually or in all possible combinations. In particular, all features of the above-described exemplary embodiments and/or their modifications are combinable as desired. In addition or as an alternative, the following modifications are possible, in particular.

Device 15 may be switched on independently of the different communications phases 451, 452, 453 or may be switched on only in data phase 452. In the latter case, however, device 15 must receive a corresponding switching pulse for the switch-on or switch-off. For example, this is realizable via the additional line by way of which switching signal S1 is transmitted, as described above with reference to the first exemplary embodiment.

Receive threshold T_d shown in the figures is based on the assumption that bus states U_D0, U_D1 in bus system 1 are driven inversely to one another at VDIFF levels that are identical in terms of their amounts. However, it is alternatively possible to adapt receive threshold T_d accordingly if bus states U_D0 and U_D1 are driven at two different positive VDIFF levels, for example.

Even if the present invention has been described above using the CAN bus system as the example, the present invention may be used in any communications network and/or communications method in which two different communications phases are used in which the bus states that are generated for the different communications phases differ. In particular, the present invention may be used in developments of other serial communications networks such as Ethernet, and/or 100 Base-T1 Ethernet, field bus systems and others.

Bus system 1 according to the exemplary embodiments may particularly be a communications network in which data are serially transmittable using two different bit rates. It is advantageous but not a mandatory requirement that an exclusive, collision-free access of a subscriber station 10, 20, 30 to a shared channel is ensured in bus system 1 at least for certain time periods.

The number and arrangement of subscriber stations 10, 20, 30 in bus system 1 of the exemplary embodiments can be selected as desired. In particular, subscriber station 20 may be omitted in bus system 1. It is possible that one or more of subscriber station(s) 10 or 30 is/are available in bus system 1. It is possible that all subscriber stations in bus system 1 have an identical development, that is to say, only subscriber station 10 or only subscriber station 30 is provided.

All above-described variants for the detection of the transmission conflict may be subject to time filtering in order to improve the robustness with regard to electromagnetic compatibility (EMC) and with regard to electrostatic charges (ESC), pulses and other interference.

It is furthermore possible to shorten the bit period t_bt2 in data phase 452 in comparison with bit period t_bt1 in arbitration phase 451 and end-of-frame phase 453. In this case, a transmission at a greater bit rate takes place in data phase 452 than in arbitration phase 451 and end-of-frame phase 453. This allows for an even further increase in the transmission speed in bus system 1.

The invention claimed is:

1. A device for a serial bus system, comprising:
   a transmit signal analysis module configured to count edges of a transmit signal that is to be sent on a bus of the bus system in order to exchange a message between subscriber stations of the bus system;
   a receive signal analysis module configured to count edges of a receive signal which is generated from a signal transmitted on the bus because of the transmit signal, in which bus states of the signal for the message in a first communications phase differ from bus states of the signal received in a second communications phase; and
   an evaluation module configured to evaluation a difference that results from a comparison of edges counted by the transmit signal analysis module and edges counted by the receive signal analysis module, wherein, the evaluation module is configured to signal, in the event that a signal propagation time on the bus is greater than a bit time of the receive signal, whether an amount of the difference is less than or equal to a predefined value or whether the amount of the difference is greater than the predefined value, and wherein the predefined value is greater than zero.

2. The device as recited in claim 1, wherein the transmit signal analysis module has a counter for counting falling edges of the transmit signal, and the receive signal analysis module has a counter for counting falling edges of the receive signal.

3. The device as recited in claim 1, wherein:
   the transmit signal analysis module has a first counter for counting falling edges of the transmit signal and a second counter for counting rising edges of the transmit signal,
   the receive signal analysis module has a first counter for counting falling edges of the receive signal and a second counter for counting rising edges of the receive signal, and
   the evaluation module is configured to evaluate a difference that results from a comparison of the edges counted by the first counters of the transmit signal analysis module and the receive signal analysis module, and to evaluate a difference that results from a comparison of the edges counted by the second counters of the transmit signal analysis module and the receive signal analysis module.

4. The device as recited in claim 1, wherein the evaluation module is configured to signal, in the event that a signal propagation time on the bus is lower than or equal to a bit time of the receive signal, whether an amount of the difference is equal to zero or whether the amount of the difference is greater than zero.

5. The device as recited in claim 1, wherein the evaluation module is configured to carry out the evaluation after a count value has been incremented by the receive signal analysis module, and the evaluation module is configured to output a signaling of the evaluation at a connection of the device at which the receive signal is to be output from the device.

6. The device as recited in claim 1, wherein the transmit signal analysis module is configured to use the transmit signal as a clock for the counting and to filter out overshoots at the edges of the transmit signal, and/or the receive signal analysis module is configured to use the receive signal as a clock for the counting and to filter out overshoots at the edges of the receive signal.

7. The device as recited in claim 1, wherein the bus states of the signal received from the bus in the first communications phase are generated using a different physical layer than the bus states of the signal received in the second communications phase.

8. The device as recited in claim 1, wherein it is negotiated in the first communications phase which one of the subscriber stations of the bus system receives an at least intermittent exclusive, collision-free access to the bus in a following second communications phase.

9. The device as recited in claim 1, further comprising:
   a transmitter module for transmitting messages onto the bus, the transmitter module being configured to switch between a first operating mode and a second operating mode during the transmission of the first and second communications phases of each message.

10. The device as recited in claim 9, wherein:
    in the first operating mode, the transmitter module is configured to generate a first data state as a bus state with different bus levels for two bus conductors of the bus line, and to generate a second data state as a bus state with the same bus level for the two bus conductors of the bus line, and
    the transmitter module in the second operating mode is configured to generate the first data state and the second data state as a respective bus state with different bus levels for the two bus conductors of the bus line.

11. The device as recited in claim 1, further comprising: a receiver module configured to generate the receive signal from the signal received from the bus, the receiver module being configured to use a receive threshold in the first communications phase whose voltage value differs from a voltage value of a receive threshold in the second communications phase.

12. A subscriber station for a serial bus system, comprising:
a communications control device configured to control a communication of the subscriber station with at least one other subscriber station of the bus system; and
a device including:
a transmit signal analysis module configured to count edges of a transmit signal that is to be sent on a bus of the bus system in order to exchange a message between subscriber stations of the bus system,
a receive signal analysis module configured to count edges of a receive signal which is generated from a signal transmitted on the bus because of the transmit signal, in which bus states of the signal for the message in a first communications phase differ from bus states of the signal received in a second communications phase, and
an evaluation module configured to evaluation a difference that results from a comparison of edges counted by the transmit signal analysis module and edges counted by the receive signal analysis module, wherein, the evaluation module is configured to signal, in the event that a signal propagation time on the bus is greater than a bit time of the receive signal, whether an amount of the difference is less than or equal to a predefined value or whether the amount of the difference is greater than the predefined value, and wherein the predefined value is greater than zero;
wherein the device is connected to the communications control device in such a way that the signaling of the evaluation module is output to the communications control device.

13. The subscriber station as recited in claim 12, wherein the device is configured to signal the evaluation of the evaluation module to the communications control device by the receive signal and/or by another signal via a separate line in order to indicate a transmission conflict on the bus; and wherein the communications control device is configured to generate or abort the transmit signal based on the signal of the evaluation of the evaluation module and/or to signal a transmission conflict to other subscriber stations of the bus system.

14. A bus system, comprising:
a bus; and
at least two subscriber stations which are connected to one another via the bus in such a way that they are able to serially communicate with one another, at least one of the subscriber stations including:
a communications control device configured to control a communication of the subscriber station with at least one other subscriber station of the bus system; and
a device including:
a transmit signal analysis module configured to count edges of a transmit signal that is to be sent on a bus of the bus system in order to exchange a message between subscriber stations of the bus system,
a receive signal analysis module configured to count edges of a receive signal which is generated from a signal transmitted on the bus because of the transmit signal, in which bus states of the signal for the message in a first communications phase differ from bus states of the signal received in a second communications phase, and
an evaluation module configured to evaluation a difference that results from a comparison of edges counted by the transmit signal analysis module and edges counted by the receive signal analysis module, wherein, the evaluation module is configured to signal, in the event that a signal propagation time on the bus is greater than a bit time of the receive signal, whether an amount of the difference is less than or equal to a predefined value or whether the amount of the difference is greater than the predefined value, and wherein the predefined value is greater than zero;
wherein the device is connected to the communications control device in such a way that the signaling of the evaluation module is output to the communications control device.

15. A method for a communication in a serial bus system, the method comprising the following steps:
counting, using a transmit signal analysis module, edges of a transmit signal that is to be transmitted on a bus of the bus system in order to exchange a message between subscriber stations of the bus system;
counting, using a receive signal analysis module, edges of a receive signal that is generated from a signal transmitted on the bus because of the transmit signal, in which bus states of the signal for the message in a first communications phase differ from bus states of the signal received in a second communications phase;
evaluating, using an evaluation module, a difference that results from a comparison of the edges counted by the transmit signal analysis module and the edges counted by the receive signal analysis module; and
signaling, using the evaluation module, in the event that a signal propagation time on the bus is greater than a bit time of the receive signal, whether an amount of the difference is less than or equal to a predefined value or whether the amount of the difference is greater than the predefined value, the predefined value being greater than zero.

* * * * *